Figure 1:
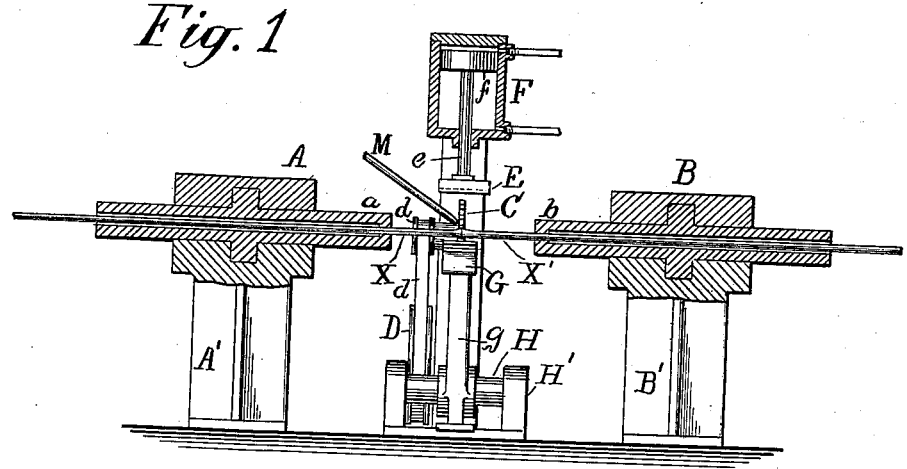

No. 731,100. PATENTED JUNE 16, 1903.
A. DICK.
PROCESS OF UNITING METALS.
APPLICATION FILED JULY 7, 1900.
NO MODEL.

WITNESSES:
Harry Goss.
Donald Campbell.

INVENTOR
Alexander Dick
BY Edwin H. Brown
His ATTORNEY.

No. 731,100. Patented June 16, 1903.

UNITED STATES PATENT OFFICE.

ALEXANDER DICK, OF LONDON, ENGLAND, ASSIGNOR TO THE AMERICAN BRASS COMPANY, OF WATERBURY, CONNECTICUT.

PROCESS OF UNITING METALS.

SPECIFICATION forming part of Letters Patent No. 731,100, dated June 16, 1903.

Application filed July 7, 1900. Serial No. 22,808. (No specimens.)

*To all whom it may concern:*

Be it known that I, ALEXANDER DICK, manufacturer, a subject of the Queen of England, residing at London, England, have invented certain new and useful Improvements in a Process for Uniting Metals, of which the following is a specification.

This invention relates to a process of uniting metals which hitherto were considered as not weldable, such as copper and copper alloys, aluminium, and the like, which hitherto were united together ordinarily by soldering or by a melting process. It has been found that when copper and copper alloys, aluminium, and tin alloys are separated at a temperature corresponding to the nature or to the composition of the metal (for brass, for instance, at red heat of about 500° centigrade) and are exposed then immediately to a strong pressure, while by shutting off the air or by employing a non-oxidizable-gas casing an oxidation of the faces to be united is avoided, the contact-faces can completely be united together.

This process can be designated quite correctly as a "welding" process.

For carrying out this process the two outer ends to be united, if, for instance, wires or rods are to be welded, are cut off by means of a circular saw, scissors, or the like suitable for removing the oxids formed during the heating. The cuts thus produced are pressed against the face of the saw or of the scissors until the tool is removed and then immediately pressed against each other and at the same time jumped. They are then placed upon an anvil or into a swage, whereupon they are worked by means of a hammer or a press. The parts of the wire or rods are held fast by clamps, so that they cannot evade. As a result there is produced on the place of union by the action of the hammer or press a corresponding high pressure, whereby the ends are completely united together. If sheet metals are to be welded, parts are also separated on the butt-faces by means of a saw or any other suitable tool. The parts of the sheet metal are then immediately firmly pressed against each other, so that they are upset slightly at the point of contact. In the same heat they are then rolled out or hammered or they are drawn over a mandrel through a matrix, whereby the pressure necessary for the union is produced.

The whole process is carried out rapidly and with facility, and the places of union have the same strength and firmness as the material itself.

I do not wish to be limited to any particular means for carrying out my process. Various apparatuses may be employed. I will describe two forms of apparatus, each adapted for carrying out a process embodying my invention, and then point out novel features in the claims.

Figure 2:
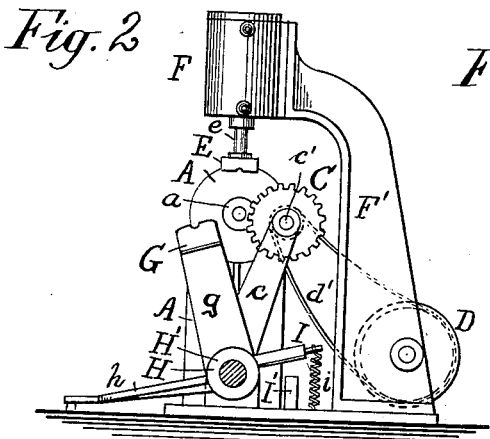
Figure 3:
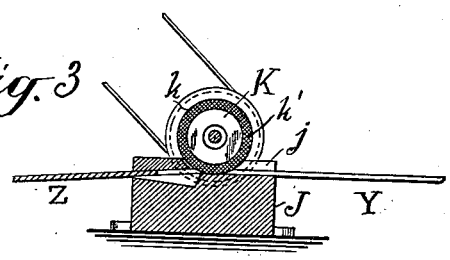
Figure 4:
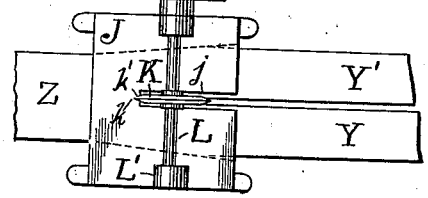

Figure 1 represents in front elevation, part sectional, a form of apparatus adapted for carrying out a process embodying my invention for uniting rods, wires, or like articles of the materials hereinbefore named as included in my invention. Fig. 2 is a side elevation of the apparatus illustrated in Fig. 1. Fig. 3 is a central sectional elevation of a form of apparatus adapted for carrying out a process embodying my invention for uniting strips, plates, rods, or like pieces of such metals. Fig. 4 is a plan view of the same.

Similar letters of reference designate corresponding parts in the several figures of the drawings.

Referring to Figs. 1 and 2, A and B represent two holding devices or chucks for holding or supporting in proper position two portions X X' of the wire, rod, or other thing to be united. The inner supporting ends $a$ and $b$ of the holding devices or chucks A and B are in suitably close proximity to the point at which the welding is to take place, depending on the conditions. Downwardly-extending brackets A' B' form convenient supporting means for the chucks A B. The form of chuck or holding device is not essential to my invention, and any suitable form thereof may be substituted for the one illustrated. The holding devices or chucks A B are preferably in alinement, since their purpose is to enable the two wires or other articles to be held in end-to-end contact when they are to be united in that manner. Provision for moving the wires or other articles or one of them endwise may be the releasing thereof by the holding devices or chucks or the longitudinal movement of one or both the chucks or holding devices or parts thereof.

A convenient cutting or abrading tool or instrumentality is that represented in the drawings as a circular saw C, the object of which, as I have pointed out, is to cut off the outer end of each of the parts to be united to remove the oxids formed during heating or otherwise and to then preserve the cut surfaces from reoxidation by remaining in contact with or pressed against such surfaces until the two parts to be united are jumped or have a welding pressure applied thereto.

By forming the tool or instrumentality C of suitable width or thickness, as indicated in Fig. 1, so as to render it capable of operating upon the two wires X X' simultaneously, I may dispense with the necessity of providing a second tool and also effect the bringing in closer proximity the two ends of wires X X' or other articles to be united.

The following is a convenient means to mount the circular saw C. It is shown fast upon a short shaft $c'$, that is mounted to rotate it, and extends through the upper end of an arm $c$, that is in turn mounted to permit a forward-and-backward reciprocating or swinging movement of the circular saw C, preferaby in a plane at right angles to the line of and intermediate of the holding devices or chucks A B.

To actuate the circular saw C, a pulley $d$ may be employed, fixed upon that part of shaft $c'$ that extends through the swinging arm $c$, a continuously-rotated pulley D and a belt $d'$ serving to rotate pulley $d$ when the arm $c$ is moved or swung forward.

The reciprocating or swinging of arm $c$ may be done by hand, but is preferably done by mechanism, such as will hereinafter be described.

I will now describe a convenient means to produce a welding pressure, as by hammering, upon the ends of the wires, rods, or other things to be welded or united.

E represents a hammer mounted to move toward and from the place of union, such arrangement being superior to a purely manual operation. To permit of great pressure or force, it is preferable to use a pneumatic, steam, or hydraulic cylinder F of any convenient description, the piston $f$ of which is connected through piston-rod $e$ to hammer E. Any well-known hand-operated or automatic valve construction may be employed to effect the to-and-fro movements of piston $f$ and hammer E. Cylinder F is mounted on a fixed bracket F'.

To coöperate with hammer E, it is preferable to employ an anvil or block of suitable weight and of proper construction to receive or support the two rods, wires, or other things that are to be united. It is sometimes preferable to have this anvil movable to and from the place of union. When the swinging circular saw C, above described, is employed, it is particularly desirable to employ an anvil capable of movement to and from the place of union and more particularly movable in a direction transverse to that of the wire, rod, or other thing in order that such anvil may be disengaged from the articles to be united (as I prefer it shall be) while the cutting or abrading tool is operating upon them and afterward returned to a position where it may serve to back up the articles during the hammering or pressing operation.

G represents such an anvil or block. Forward-and-backward movements may be given to such anvil or block by means of an arm $g$. Any convenient means may be employed to reciprocate or swing the arm $g$ forward and backward. I prefer to accomplish this by means of the same mechanism employed to reciprocate or swing the hereinbefore-described arm $c$, carrying the cutting or abrading tool C. Such mechanism may conveniently comprise an oscillating shaft H, that is mounted in fixed bearings H' and about which the arms $g$ and $c$ are fitted to oscillate. The said arms will oscillate in unison if both be fixed to said shaft or if one be fixed to the other. In either such case a treadle $h$ may be employed, arranged in fixed relation to the arms $g$ $c$, whereby the operator may by a movement of the foot impart an oscillatory movement to the said arms. A second arm I, also in fixed relation to arms $g$ and $c$ and treadle $h$, is shown as being spring-actuated, spring $i$ serving to maintain the anvil G in normal position at the place of union of wires X X' or other articles, block I' serving as a stop upon which arm I rests when in normal position.

One manner in which the heretofore-described apparatus may be operated is as follows: The operator having arranged the wires, rods, or other articles to be united in position in the chucks or holding devices A B (the said articles being properly heated) effects an adjustment that brings the two articles approximately in contact, the plane of contact being opposite the tool C. He then presses the treadle $h$ to bring the circular C toward the point of union. In Fig. 2 the saw is shown in a position where it is just about to cut or operate upon the wires, rods, or other articles. A further movement of the treadle and tool will bring the latter into operation to cuts its way through the point of union of X and X', thereby mechanically removing the oxidized extremities of both X and X' in their hot condition, as explained. The freshly-cut surfaces so produced are pure metallic faces, and it will be observed that they remain in contact with the tool C during and after the cutting, thereby avoiding exposure to the atmosphere and consequent oxidation of the surfaces to be united. The operator then releases the treadle $h$, thereby effecting the removal of the cutting or abrading tool and through the quick action of spring $i$ the substitution of the anvil or block G into its normal or welding position. During this operation the operator will, if necessary, effect a slight relative longitudinal movement between the wires, rods, or articles X X' sufficient to compensate for the thickness of tool C and bring them again in actual contact. The operator will then immediately (having control of the valves of cylinder F) cause the hammer E to be actuated from cylinder F to bring about a welding pressure or a hammering action upon, sufficient to effect a reuniting of, the wires, rods, or articles X X'.

I will now describe the apparatus illustrated in Figs. 3 and 4 of the drawings, which is adapted more particularly to unite along their sides as distinguished from their end portions two or more continuous strips, plates, rods, or like articles of copper, copper alloys, aluminium, or like metals by a process embodying my invention. Y Y' may represent two such strips or other articles which when united form the larger strip or article Z.

To produce a suitable welding pressure or action, a die J may be employed, which may be of steel and is provided with a tapering die-opening extending from right to left in the figures. Said opening is shown as having its larger end to the right and of sufficient size to permit the entry thereinto of the two strips or articles Y Y', with an additional space sufficient to allow for a cutting or abrading tool, to be described hereinafter, and its smaller end of the cross-sectional dimensions of the finished product Z. Die J is shown apertured centrally, as at $j$, to admit of a cutting or abrading tool. Such tool may comprise a revoluble disk K, fitted, as by shaft L, bearings L', and pulley $l$, to be rapidly turned to effect a cutting or abrading action, the said tool preferably provided with a cutting edge $k$, forming an apex the sides $k'$ of which are abrading or file-like in character.

The operation is as follows: The heated strips or articles Y Y' are drawn through die J in any usual manner. The tool K, it will be understood, is located between the strips Y Y', near that point within the die at which the strips Y Y' contact each other, the said strips as they are pressed inwardly at such point being acted upon by the cutting edge $k$ and surface $k'$, which operate to mechanically remove in hot condition the extreme edges of the strips or articles Y Y', whereby pure metallic faces are produced, which faces immediately upon leaving contact with the tool K (which until such time prevents exposure and consequent reoxidation) are pressed into contact with each other and with the increasing pressure of the narrowing die are firmly reunited and welded.

I do not wish to be limited to any particular cutting or abrading tool or instrumentality, for while I have shown a saw in one case and a cutting and abrading disk in another case there are other tools, implements, and instrumentalities that may be employed to effect the mechanical removal in heated condition of extreme end or edge portions of the articles to be united.

I have not shown a means for heating the parts or articles to be united, since such means forms in itself no part of my invention. Any convenient heating means may be employed.

To preserve the freshly-cut pure metal surfaces from oxidation, I have shown in each modification a different manner of uniting the articles immediately upon a relative movement of separation between such articles and the cutting or abrading tool or instrumentality. Other or additional means may be employed to this end. For example, a non-oxidizing atmosphere in a casing or otherwise may be employed in which to conduct the mechanical removal and reuniting operations described, one manner of providing such conditions being that which I have illustrated in connection with the first modification above described and comprising a pipe or passage M, Fig. 1, directed toward the point of union, through which the non-oxidizing gas—for example, hydrogen or coal gas—may be blown upon the hot extreme edges or ends of the articles to be united.

What I claim as my invention is—

1. The process of uniting metals without melting, consisting in heating the metal and removing the end or edge portions of the parts to be united, while in a hot condition by a severing-tool, thereby producing nascent surfaces, the surfaces so produced being held against the face of the severing-tool to avoid oxidation, then immediately pressing said nascent surfaces together and then working or forging the joint to apply a suitably high welding pressure.

2. The process of uniting metals without melting, consisting in heating the metal and removing the end or edge portions of the parts to be united, while in a hot condition by a severing-tool, thereby producing nascent surfaces, the surfaces so produced being held against the face of the severing-tool to avoid oxidation, then immediately pressing said nascent surfaces together and then working or forging the joint to apply a suitably high welding pressure, and applying a non-oxidizing gas to the parts to be worked as a supplemental means of preventing oxidation.

In witness whereof I have hereunto signed my name in the presence of two subscribing witnesses.

ALEXANDER DICK.

Witnesses:
 HENRY HASPER,
 WOLDEMAR HAUPT.